(12) United States Patent
Gudivada et al.

(10) Patent No.: US 11,641,622 B2
(45) Date of Patent: May 2, 2023

(54) OPPORTUNISTIC DUAL SIM DUAL ACTIVE OPERATION IN MULTI-SUBSCRIBER IDENTITY MODULE DEVICES

(71) Applicant: QUALCOMM Incorporated, San Diego, CA (US)

(72) Inventors: Naga Chandan Babu Gudivada, Hyderabad (IN); Sharda Ranjan, Hyderabad (IN); Tom Chin, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/327,436

(22) Filed: May 21, 2021

(65) Prior Publication Data

US 2022/0377658 A1 Nov. 24, 2022

(51) Int. Cl.
| | |
|---|---|
| *H04W 48/20* | (2009.01) |
| *H04W 4/16* | (2009.01) |
| *H04W 8/18* | (2009.01) |
| *H04W 48/16* | (2009.01) |
| *H04W 88/06* | (2009.01) |

(52) U.S. Cl.
CPC ............ *H04W 48/20* (2013.01); *H04W 4/16* (2013.01); *H04W 8/183* (2013.01); *H04W 48/16* (2013.01); *H04W 88/06* (2013.01)

(58) Field of Classification Search
CPC ....... H04W 48/20; H04W 4/16; H04W 8/183; H04W 48/16; H04W 88/06
See application file for complete search history.

(56) References Cited

U.S. PATENT DOCUMENTS

| 11,012,850 B1* | 5/2021 | Zhu ................ H04W 4/021 |
| 2010/0067434 A1* | 3/2010 | Siu ................ H04W 48/18 |
| | | 455/434 |
| 2015/0023217 A1* | 1/2015 | Hu ................ H04W 76/15 |
| | | 370/259 |
| 2021/0112399 A1 | 4/2021 | Gopal et al. |
| 2021/0368327 A1* | 11/2021 | Gao ................ H04W 24/08 |

(Continued)

FOREIGN PATENT DOCUMENTS

WO 2021026877 A1 2/2021

OTHER PUBLICATIONS

Huawei, et al., "Overview of Rel-17 Work Areas for NR and LTE", 3GPP TSG RAN Meeting #84, RP-191486, Final (WAS RP-191007), 3rd Generation Partnership Project, Mobile Competence Centre, 650, Route Des Lucioles, F-06921, Sophia-Antipolis, vol. TSG RAN, No. Newport Beach, USA, Jun. 3, 2019-Jun. 6, 2019, Jun. 4, 2019, 22 Pages, May 29, 2019, XP051748412.

(Continued)

*Primary Examiner* — Minjung Kim
(74) *Attorney, Agent, or Firm* — Hayns and Boone LLP

(57) ABSTRACT

A method of wireless communication performed by a user equipment (UE) includes in the UE, having a first subscriber identity module (SIM) and a second SIM, causing the first SIM to camp on a first cell associated with a first technology in standalone mode; selecting a second cell associated with a second technology in standalone mode; and causing the second SIM to camp on the second cell concurrently with the first SIM camping on the first cell.

29 Claims, 7 Drawing Sheets

(56) References Cited

U.S. PATENT DOCUMENTS

| | | | |
|---|---|---|---|
| 2022/0053606 A1* | 2/2022 | Jeong ................... | H04W 8/183 |
| 2022/0132612 A1* | 4/2022 | Chang ................... | H04W 36/14 |
| 2022/0141744 A1* | 5/2022 | Mallikarjunan ...... | H04W 48/18 |
| | | | 370/329 |
| 2023/0044100 A1* | 2/2023 | Pakniat ............. | H04W 36/0094 |

OTHER PUBLICATIONS

International Search Report and Written Opinion—PCT/US2022/028624—ISA/EPO—dated Aug. 31, 2022.

* cited by examiner

OPPORTUNISTIC DUAL SIM DUAL ACTIVE OPERATION IN MULTI-SUBSCRIBER IDENTITY MODULE DEVICES

TECHNICAL FIELD

This application relates to wireless communication systems, and more particularly to Dual SIM Dual Active operation in multi-subscriber identity module (MultiSim) devices (e.g., user equipment (UE)).

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Furthermore, as wireless communication becomes cheaper and more reliable, expectations among consumers change. Some UE manufacturers are responding to consumer preferences by including multiple subscriber identity modules (SIMs) within UEs.

As use cases and diverse deployment scenarios continue to expand in wireless communication, techniques to allow users to exploit multiple SIMS may also yield benefits.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication performed by a user equipment (UE) includes: in the UE, having a first subscriber identity module (SIM) and a second SIM, causing the first SIM to camp on a first cell associated with a first technology in standalone mode; selecting a second cell associated with a second technology in standalone mode; and causing the second SIM to camp on the second cell concurrently with the first SIM camping on the first cell.

In an additional aspect of the disclosure, a user equipment (UE) includes a first subscriber identity module (SIM) associated with a first service provider subscription and a second SIM associated with a second service provider subscription; and a processor configured to access the first SIM and the second SIM, the processor further configured to: camp on a first cell associated with a first technology in standalone mode using the first service provider subscription; select a second cell associated with a second technology in standalone mode; and camp on the second cell, using the second service provider subscription, concurrently with camping on the first cell.

In an additional aspect of the disclosure, a non-transitory computer-readable medium having program code recorded thereon for wireless communication by a user equipment (UE), the program code includes code for camping on a first cell associated with a first technology in standalone mode using a first service provider subscription; code for selecting a second cell associated with a second technology in standalone mode; and code for providing Dual SIM Dual Active (DSDA) operation, including camping on the second cell using a second service provider subscription concurrently with camping on the first cell.

In an additional aspect of the disclosure, a user equipment (UE) includes means for camping on a first cell associated with a first technology in standalone mode using a first service provider subscription; means for selecting a second cell associated with a second technology in standalone mode; and means for providing Dual SIM Dual Active (DSDA) operation, including camping on the second cell using a second service provider subscription concurrently with camping on the first cell.

Other aspects, features, and embodiments will become apparent to those of ordinary skill in the art, upon reviewing the following description of specific, exemplary aspects in conjunction with the accompanying figures. While features may be discussed relative to certain aspects and figures below, all aspects can include one or more of the advantageous features discussed herein. In other words, while one or more aspects may be discussed as having certain advantageous features, one or more of such features may also be used in accordance with the various aspects discussed herein. In similar fashion, while exemplary aspects may be discussed below as device, system, or method aspects it should be understood that such exemplary aspects can be implemented in various devices, systems, and methods.

DETAILED DESCRIPTION

Figure 1:
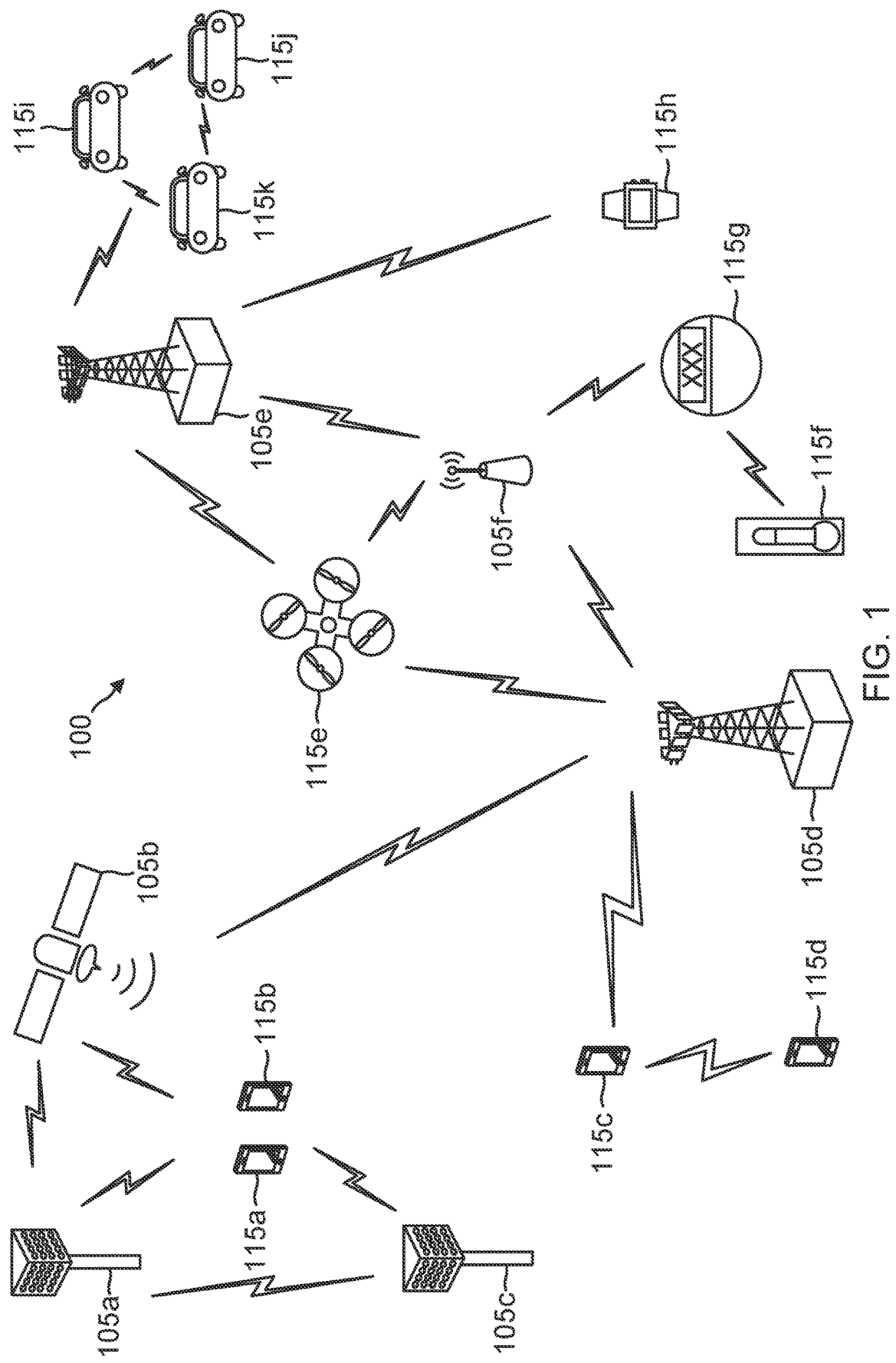
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In sonic aspects, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UNITS). In particular, long term evolution (LTE) is a release of UMTS that uses E-UTRA, UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1 M nodes/km²), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km²), extreme data rates (e.g., multi-Gbps rate, 100+ Mbps user experienced rates), and deep awareness with advanced discovery and optimizations.

A 5G NR system may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW. In certain aspects, frequency bands for 5G NR are separated into two different frequency ranges, a frequency range one (FR1) and a frequency range two (FR2). FR1 bands include frequency bands at 7 GHz or lower (e.g, between about 410 MHz to about 7125 MHz). FR2 bands include frequency bands in mmWave ranges between about 24.25 GHz and about 52.6 GHz. The mmWave bands may have a shorter range, but a higher bandwidth than the FR1 bands. Additionally, 5G NR may support different sets of subcarrier spacing for different frequency ranges.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

In certain aspects, a wireless communication device or UE is a multiple SIM (MultiSim) device capable of utilizing multiple subscriptions for communication with one or more networks. For instance, the UE may include two SIMS, a first SIM for a first subscription and a second SIM for a second subscription. In some instances, the first and second subscriptions may be provided by the same operator. For example, the first subscription and the second subscription may correspond to different user accounts and/or services on the same operator network. In other instances, the first and second subscriptions may be provided by different operators. In any case, in certain scenarios, the UE may communicate using the first subscription and/or the second subscription. In some instances, the UE may operate in a dual-SIM dual-standby (DSDS) mode, where both subscriptions can be on standby (in an idle mode) waiting to begin communications. However, when a communication or network connection is established on one SIM (e.g., the first subscription), the other SIM (e.g., the second subscription) is no longer active. That is, one SIM may be active at a given time. The DSDS mode may be suitable for UEs that are equipped with a single transceiver and/or radio frequency (RF) chain which can either be utilized by the first subscription or the second subscription. In other instances, the UE may operate in a dual-SIM dual-active (DSDA) mode, where the UE may simultaneously connect to the same network or different networks via the first SIM and the second SIM. To operate in the DSDA mode, the UE may have separate transceiver and/or RF chains or resources for the first SIM and the second SIM. In the present disclosure, an operation or communication performed via a SIM may refer to an operation or communication performed for a wireless service subscription associated with the SIM (where the subscription information for the wireless service is stored).

As 5G networks are deployed, some 5G cells may use an existing cell with another technology (e.g., LTE) for control signaling. When operating in a 5G mode, it is said that the cell is operating in a non-standalone (NSA) mode. By contrast, other 5G cells may perform both signaling and connected mode using 5G protocols. Those cells operate in a standalone (SA) mode. Various implementations herein allow for a device that usually operates in a DSDS mode to search for cells operating in SA mode and to leverage that SA mode to provide DSDA functionality, as described in more detail below.

In one example, a UE has two SIMs. A first SIM (SIM 1) is camped on a 5G cell and, more specifically, a cell operating in FR1 SA mode. Logic within the UE then searches for a cell operating in FR2 SA mode. Assuming that the UE does find a compatible cell operating in FR2 SA mode, then it performs initial access and causes the second SIM 2 camp on the cell operating in FR2 SA mode. Accordingly, SIM 1 is now camped on a cell in FR1 SA mode, and SIM 2 is now camped on a cell in FR2 SA mode. This arrangement may allow for full concurrency, assuming the UE has an RF chain for FR1 and another RF chain for FR2.

It should be noted in this example that both of the cells are operating in SA mode. If one of the cells was operating in NSA mode, then the SIM camped on that cell would usually be expected to support both FR1 and FR2. However, since both cells in this example are in SA mode, then SIM 1 does not need use of the RF chain for FR2, and SIM 2 does not need use of the RF chain for FR1. In this example the SIMs have RF paths that are orthogonal in both the idle and connected modes. Therefore, the SIMs do not interfere with each other and can provide concurrent access. In other words, both cells will be expected to have 100% page decode without collision and can handle incoming simultaneous calls without resorting to RF coexistence mitigation at the software level.

In another example, the UE may be able to achieve DSDA functionality when one SIM is camped on a first cell in SA FR1 mode and the other SIM is camped on a second cell and FR1 mode. For instance, some bands in FR1 may be low band (e.g., below 1 GHz), and other bands may be high band (e.g., at or near 6 GHz). Assuming that SIM 1 is camped on a cell in SA FR1 mode in a low band and that SIM 2 is camped on a cell in SA FR1 mode in a high band, then such frequencies may be orthogonal, allowing the use of a single RF chain to effectively service both bands concurrently.

In yet another example, both SIMs are associated with a same telecommunication carrier and are camped on a same cell. Continuing with the example, SIM 1 is camped on FR1 in SA mode and SIM 2 is camped on FR2 in SA mode and, therefore, the UE can provide DSDA operation as described above. Additionally, since both SIMs are camped on the same cell and associated with the same carrier, the UE may be able to support calls on both SIMs using a same protocol stack. An advantage of using a same protocol stack is that it may reduce a number of central processing unit (CPU) operations per second, thereby saving power and extending battery life when compared to a scenario that use a separate protocol stacks for each SIM.

The UE may store a database to assist in identifying cells that may provide for opportunistic DSDA operation. For instance, in the example above when SIM 1 is camped on a first cell on FR1 in SA mode, and the SIM 2 is camped on a second cell on FR2 in SA mode, then the UE may create an entry in its database to link the first cell, the second cell, and their SA mode capabilities. Sometime in the future when the UE enters an area served by the first cell, then it may access the database using the first cell as a key, find an entry associated with the first cell, determine from the entry that the second cell has been used by the other SIM in conjunction with the first SIM camping on the first cell, and then attempt to connect to the second cell in FR2 SA mode.

In some examples, the UE may continually update the database as it finds opportunities for DSDA operation. For instance, the UE may also record in the database when it finds low band FR1 SA mode and high band FR1 SA mode, thereby assisting the UE in establishing DSDA sometime in the future when in range of those same cells. Also, the UE may also update the database to note when a single cell may offer FR1/FR2 both in SA mode or low band/high band FR1 and FR2 both in SA mode. In a future encounter with that cell, the UE may search its database to determine such capability and then to cause SIM 1 and SIM 2 to camp on those different SA modes to allow for DSDA operation and protocol stack sharing.

Aspects of the present disclosure can provide several benefits. For example, while some current UEs may have two transceivers, one for FR1 and one for FR2, and have multiple SIMs, such UEs may only allow for DSDS mode. This may be due to current unavailability of 5G cells capable of operating in SA mode. However, various implementations described herein may allow such UE to detect when SA mode is available and to leverage that availability to operate in DSDA mode. A benefit provided by DSDA mode is that it may provide more consumer satisfaction when both SIMs can support simultaneous calls. Also, implementations described herein may be used with UE hardware that provides less than two independent RF chains per SIM. For instance, when using FR1/FR2 in SA mode, the UE may have as few as two separate RF chains with each RF chain used by a respective SIM. Or in an example when using low band/high band FR1 in SA mode, even a single RF chain shared by both SIMs may provide DSDA operation. Thus, some implementations may suffice with less hardware than would otherwise be expected to support DSDA.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 (individually labeled as 115a, 115b, 115c, 115d, 115e, 115f, 115g, 115h, and 115k) and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a, and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support communications with ultra-reliable and redundant links for devices, such as the UE 115e, which may be airborne. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-action-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115*j*, or 115*k* and other UEs 115, and/or vehicle-to-infrastructure (V2I) communications between a UE 115*i*, 115*j*, or 115*k* and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some aspects, the subcarrier spacing between adjacent subcarriers may be fixed, and the total number of subcarriers (K) may be dependent on the system BW. The system BW may also be partitioned into subbands. In other aspects, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSS) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some aspects, the BSs 105 may broadcast the PSS, the SSS, and/or the MIB in the form of synchronization signal block (SSBs) and may broadcast the RMSI and/or the OSI over a physical downlink shared channel (PDSCH). The MIB may be transmitted over a physical broadcast channel (PBCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL, and/or DL scheduling grants to the UE 115 via a PDCCH. The scheduling grams may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant. The connection may be referred to as an RRC connection. When the UE 115 is actively exchanging data with the BS 105, the UE 115 is in an RRC connected state.

In an example, after establishing a connection with the BS 105, the UE 115 may initiate an initial network attachment procedure with the network 100. The BS 105 may coordinate with various network entities or fifth generation core (5GC) entities, such as an access and mobility function (AMF), a serving gateway (SGW), and/or a packet data network gateway (PGW), to complete the network attachment procedure. For example, the BS 105 may coordinate with the network entities in the 5GC to identify the UE, authenticate the UE, and/or authorize the UE for sending and/or receiving data in the network 100. In addition, the AMF may assign the UE with a group of tracking areas (TAs). Once the network attach procedure succeeds, a context is established for the UE 115 in the AMF. After a successful attach to the network, the UE 115 can move around the current TA. For tracking area update (TAU), the BS 105 may request the UE 115 to update the network 100 with the UE 115's location periodically. Alternatively, the UE 115 may only report the UE 115's location to the network 100 when entering a new TA. The TAU allows the network 100 to quickly locate the UE 115 and page the UE 115 upon receiving an incoming data packet or call for the UE 115.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, a UE 115 may be capable of utilizing multiple subscriber identity modules relation to each other to illustrate a communication scenario for a MultiSim capable UE.

Figure 2:
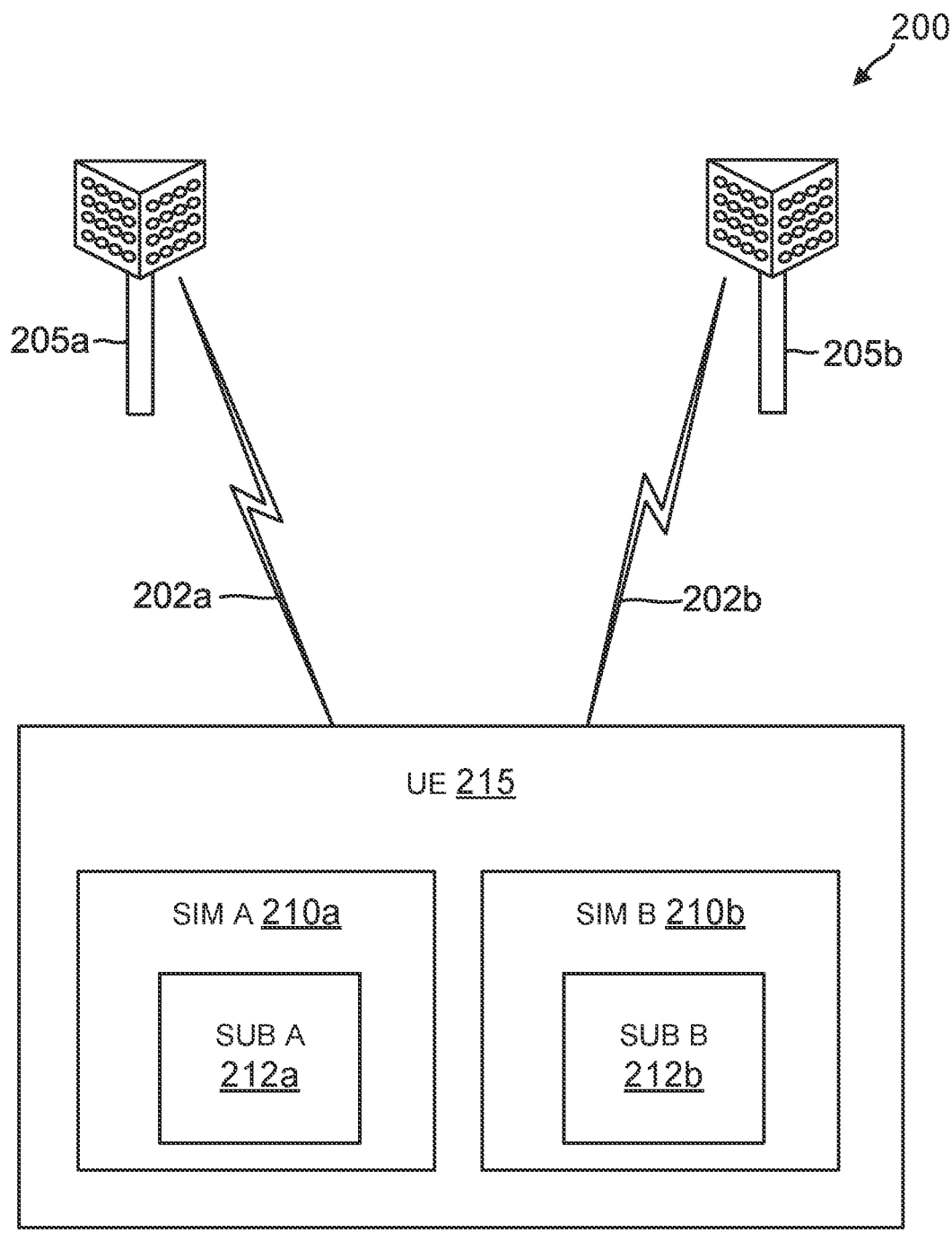
FIG. 2 illustrates a communication scenario utilizing multiple subscriptions according to some aspects of the present disclosure.

FIG. 2 illustrates a communication scenario 200 that utilizes multiple subscriptions according to some aspects of the present disclosure. The communication scenario 200 may correspond to a communication scenario among BSs 105 and or UEs 115 in the network 100. For simplicity, FIG. 2 illustrates two BSs 205 (shown as 205a and 205b) and one UE 215, but a greater number of UEs 215 (e.g., the about 3, 4, 3, 6, 7, 8, 9, 10, or more) and/or BSs 205 (e.g., the about 3, 4 or more) may be supported. The BS 205 and the UEs 215 may be similar to the BSs 105 and the UEs 115, respectively.

In the scenario 200, the UE 215 is capable of utilizing multiple SIM or SIM cards for communication with one or more networks. For simplicity, FIG. 2 illustrates the UE 215 including two SiMs 210 (shown as SIM A 210a and SIM B 210b), but the 215 may include more than two SIMs (e.g., about 3, 4 or more). In some aspects, each SIM 210 may include integrated circuits and/or memory configured to store information used for accessing a network, for example, to authenticate and identify the UE 215 as a subscriber of the network. Some examples of information stored at the SIM A 210a and/or SIM B 210b may include, but not limited to, a subscriber identity such as an international mobile subscriber identity (IMSI) and/or information and/or key used to identify and authenticate the UE 215 in a certain provider network. As an example, the UE 215 may subscribe to a first operator and a second operator. That is, the UE 215 may have a first subscription 212a (shown as SUB A) with the first operator and a second subscription 212b (shown as SUB B) with the second operator. Accordingly, the SIM A 210a may store or maintain information for accessing a network of the first operator based on the first subscription 212a, and the SEM B 210b may store information for access a network of the second operator based on the second subscription 212b. In some instances, the first operator and the second operator may correspond to the same operator. For example, the first subscription 212a and the second subscription 212b may correspond to different user accounts and/or services subscribed with the same operator. In other instances, the first operator may be different from the second operator.

In operation, the UE 215 may communicate with a BS 205a (operated by the first operator) using the SIM A 210a via a radio link 202a. Further, the UE 215 may communicate with a BS 205b (operated by the second operator) using the SIM B 210b via a radio link 202b. In some aspects, the UE 215 may use the same radio access technology (e.g., NR or NR-U) for communication with the BS 205a and the BS 205b. In other aspects, the UE 215 may use one radio access technology (e.g., NR or NR-U) for communication with the BS 205a and another radio access technology (e.g., LTE) for communication with the BS 205b. Although FIG. 2 illustrates the UE 215 communicates with different BSs 205 using the SIM A 210a and the SIM B 210b, it should be understood that in other examples the UE 215 may communicate with the same BS. For instance, the UE 215 may communicate with the same BS 205a for the first subscription 212a via the SIM A 210a and for the second subscription 212b via the SIM B 210b.

Figure 3:
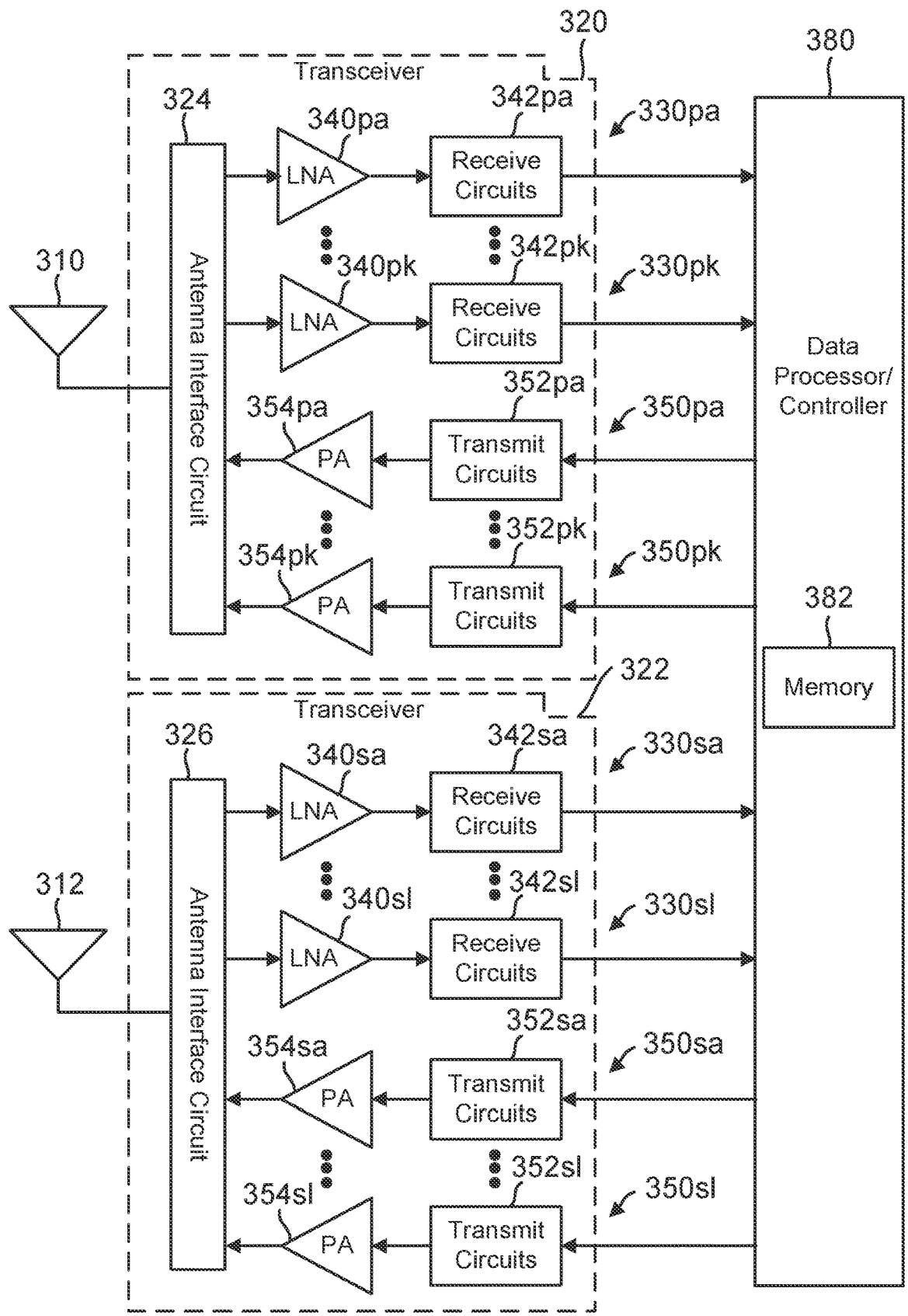
FIG. 3 is a block diagram of user equipment (EU) hardware, including multiple radio frequency (RF) chains, according to some aspects of the present disclosure.

In some aspects, the UE 215 may operate in a DSDS mode, where both SIMs 210a and 210b can be on standby (in an idle mode) waiting to begin communications. When a communication is established on one SIM (e.g., the SIM A 210a), the other SIM (e.g., the SIM B 210b) is no longer active. That is, one SIM may be active at a given time. For instance, both SIMs 210 may share a single transceiver and/or RF chain (e.g., a transceiver 320 as shown in FIG. 3) at the UE 215 for communications with corresponding network(s). In other aspects, the UE 215 may operate in a DSDA mode, where the UE 215 may simultaneously connect to the same network or different networks via the SIM A 210a and the SIM B 210b. That is, both SIM A 210a and SIM B 210b may have active communications at the same time. For instance, the UE 215 may have multiple transceiver and/or RF chains (e.g., transceivers 320, 322 as shown in FIG. 3), where each of the SIM A 210a and the SIM B 210b may utilize one of the transceiver and/or RF chains at the same time for concurrent communications.

In some aspects, the radio link 202a between the UE 215 and the BS 205a and the radio link 202b between the UE 215 and the BS 205b may be over orthogonal bands such as FR1/FR2 or low band/high band FR1. Of course, any combination of radio links 202 is possible, and the radio links may even take place using different radio access technologies. For instance, radio link 202a may carry communications according to 5G protocols, whereas radio link 202b may carry communications according to LTE protocols. Furthermore, one or both of the radio links 202 may support communications in a NSA mode or an SA mode.

Figure 6:
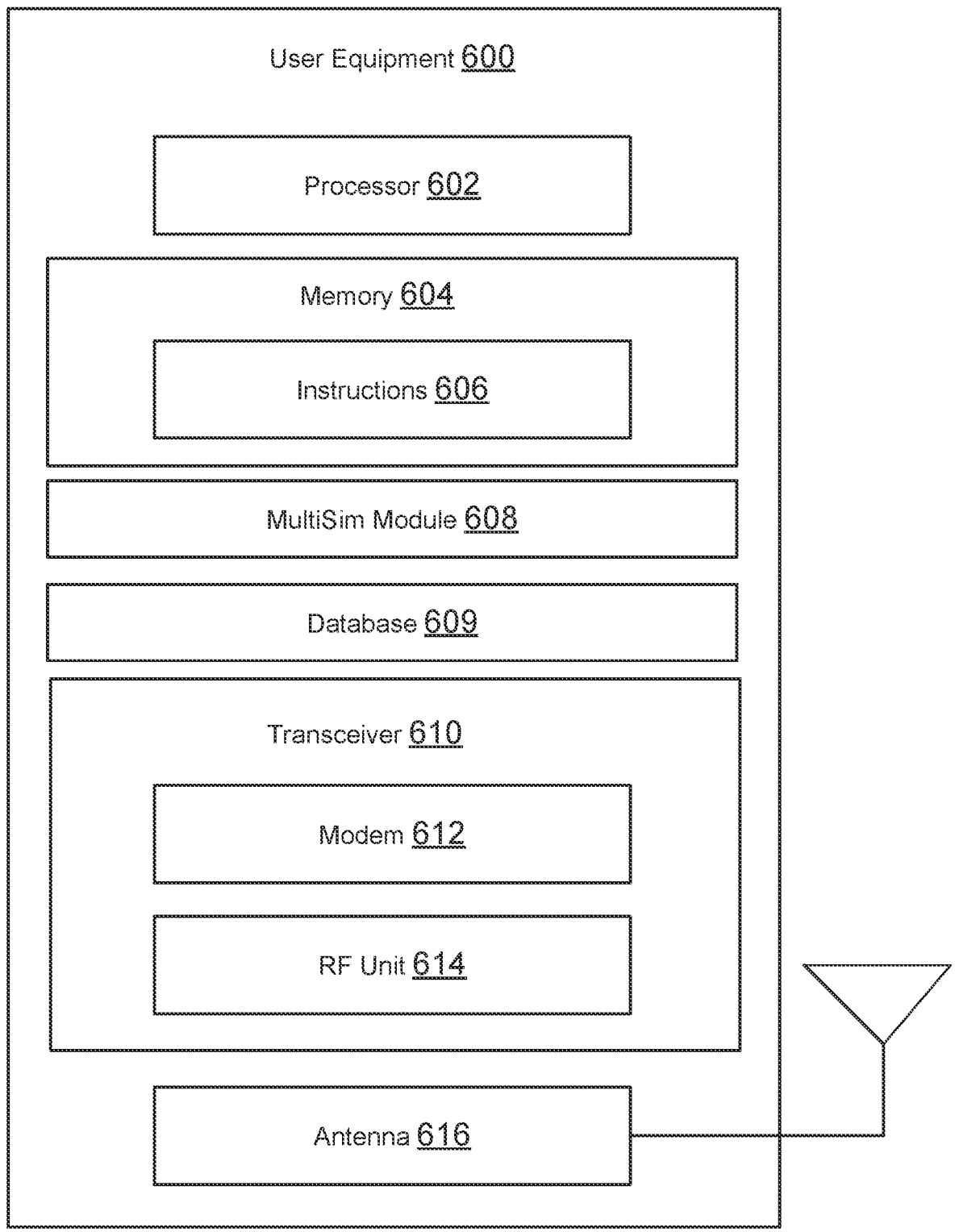
FIG. 6 illustrates a block diagram of a user equipment (UE) according to some aspects of the present disclosure.

FIG. 3 illustrates an example hardware architecture for RF chains, which may be implemented within US 115 (FIG. 1), UE 215 (FIG. 2), or UE 600 (FIG. 6). In this exemplary design, the hardware architecture includes a transceiver 320 coupled to a first antenna 310, a transceiver 322 coupled to a second antenna 312, and a data processor/controller 380. Transceiver 320 includes multiple (K) receivers 330pa to 330pk and multiple (K) transmitters 350pa to 350pk to support multiple frequency bands, multiple radio technologies, carrier aggregation, etc. Transceiver 322 includes L receivers 330sa to 330sl and L transmitters 350sa to 350sl to support multiple frequency bands, multiple radio technologies, carrier aggregation, receive diversity, multiple-input multiple-output (MIMO) transmission from multiple transmit antennas to multiple receive antennas, etc.

In the exemplary design shown in FIG. 3, each receiver 330 includes an LNA 340 and receive circuits 342. For data reception, antenna 310 receives signals from base stations and/or other transmitter stations and provides a received RF signal, which may be routed through an antenna interface circuit 324 and presented as an input RF signal to a selected receiver. Antenna interface circuit 324 may include switches, duplexers, transmit filters, receive filters, matching circuits, etc. The description below assumes that receiver 330pa is the selected receiver, though the described operations apply equally well to any of the other receivers 330. Within receiver 330pa, an LNA 340pa amplifies the input RF signal and provides an output RF signal. Receive circuits 342pa downconvert the output RF signal from RF to baseband, amplify and filter the downconverted signal, and provide an analog input signal to data processor 380. Receive circuits 342pa may include mixers, filters, amplifiers, matching circuits, an oscillator, a local oscillator (LO) generator, a phase locked loop (PLL), etc. Each remaining receiver 330 in transceivers 320 and 322 may operate in a similar manner as receiver 330pa.

In the exemplary design shown in FIG. 3, each transmitter 350 includes transmit circuits 352 and a power amplifier (PA) 354. For data transmission, data processor 380 processes (e.g., encodes and modulates) data to be transmitted and provides an analog output signal to a selected transmitter. The description below assumes that transmitter 350pa is the selected transmitter, though the described operations apply equally well to any of the other transmitters 350. Within transmitter 350pa, transmit circuits 352pa, amplify, filter, and upconvert the analog output signal from baseband to RF and provide a modulated RF signal. Transmit circuits 352pa may include amplifiers, filters, mixers, matching circuits, an oscillator, an LO generator, a PLL, etc. A PA 354pa receives and amplifies the modulated RF signal and provides a transmit RF signal having the proper output power level. The transmit RF signal may be routed through antenna interface circuit 324 and transmitted via antenna 310. Each remaining transmitter 350 in transceivers 320 and 322 may operate in a similar manner as transmitter 350pa.

FIG. 3 shows an exemplary design of receiver 330 and transmitter 350. A receiver and a transmitter may also include other circuits not shown in FIG. 3, such as filters, matching circuits, etc. All or a portion of transceivers 320 and 322 may be implemented on one or more analog (ICs, RF ICs (RFICs), mixed-signal ICs, etc. For example, LNAs 340 and receive circuits 342 within transceivers 320 and 322 may be implemented on multiple IC chips or on the same IC chip. The circuits in transceivers 320 and 322 may also be implemented in other manners.

Data processor/controller 380 may perform various functions for wireless device 110. For example, data processor 380 may perform processing for data being received via receivers 330 and data being transmitted via transmitters 350. Controller 380 may control the operation of the various circuits within transceivers 320 and 322. A memory 382 may store program codes and data for data processor/controller 380. Data processor/controller 380 may be implemented on one or more application specific integrated circuits (ASICs) and/or other ICs.

In one example, transceiver 320 may be adapted to provide operation in FR1, and transceiver 322 may be adapted to provide operation and in FR2. Furthermore in this example, an RF chain may refer to an RF path that is used by the UE to communicate with a cell. For instance, when communicating within FR1, an RF chain may include antenna 310, antenna interface circuit 324, and any of the LNAs, PAs, receive circuits, and transmit circuits (i.e., the hardware from the antenna 310 to the baseband connection input/output to the data processor 380). Similarly, an FR2 RF chain may include the hardware at transceiver 322 from the antenna 312 to the baseband connection input/output with the data processor 380).

The UE may include software logic that assigns one of the transceivers 320, 322 to a particular SIM and the other one of the transceivers to the other SIM in a dual SIM implementation. This may be true in a DSDA mode or in a DSDS mode. In an example DSDA mode in which one SIM is camped on FR1 and the other SIM is camped on FR2, the SIMs may be assigned to different transceivers and, thus, their operation may be independent and without any RF coexistence mitigation at the software level. In another DSDA example, both SIMs may be assigned to transceiver 220, with one SIM using low band FR1 and the other SIM using high band FR1. Even though the SIMS may share RF chains, the two bands are not expected to interfere, and as long as the hardware can tune to both bands concurrently, the operation of each SIM may be independent and without any RF coexistence mitigation at the software level. In some DSDS modes, the logic in the UE may assign both SIMS to both transceivers 320, 322 to ensure that both systems have access to FR1 and FR2.

Figure 4:
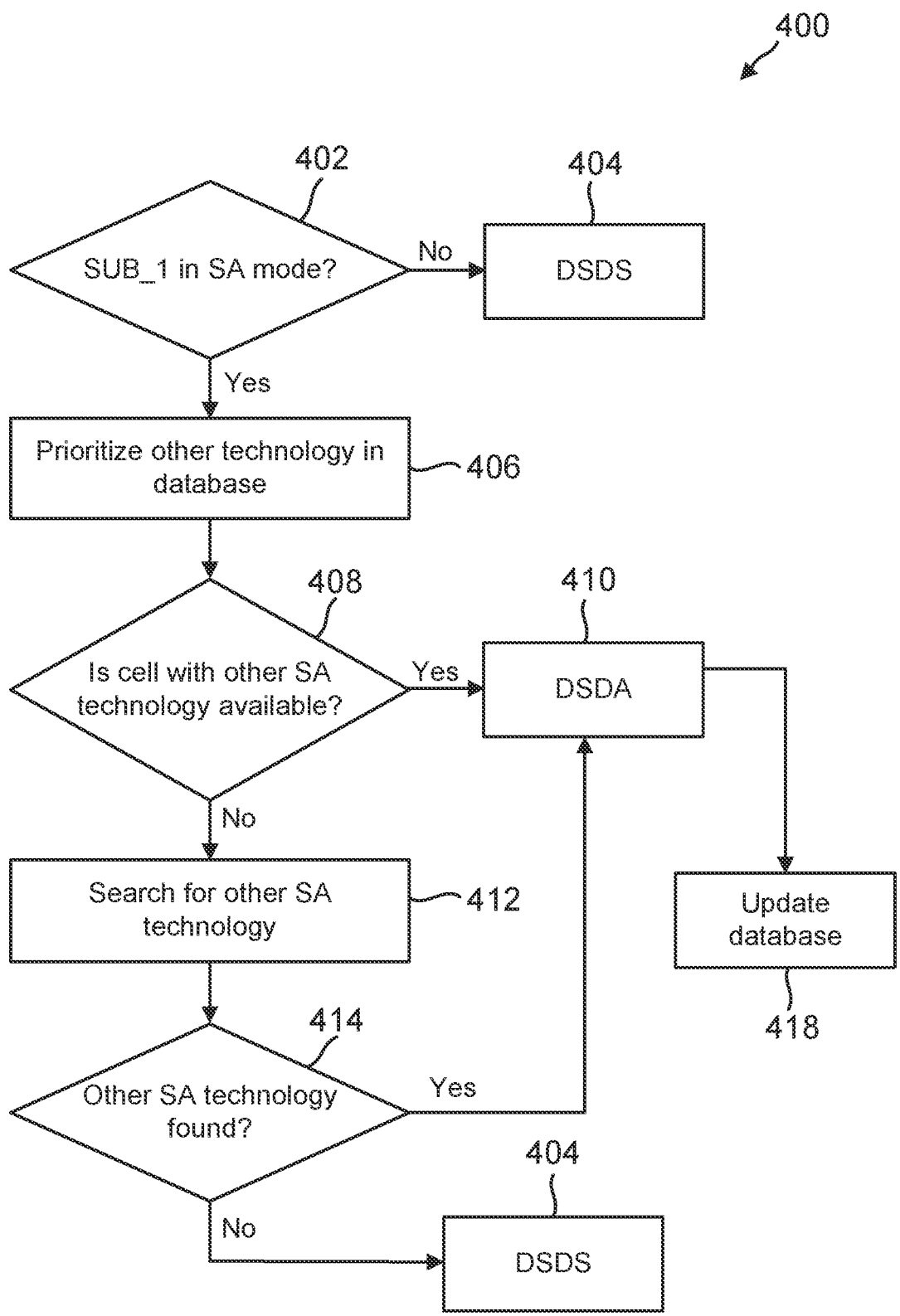
FIG. 4 is a flow diagram of a wireless communication method according to some aspects of the present disclosure.

FIG. 4 is a flowchart of a communication method 400 that utilizes multiple subscriptions according to some aspects of the present disclosure. The method 400 may be performed by a MultiSim UE (e.g., the UEs 115 and/or 215), and the method 400 may employ similar mechanisms as discussed above in relation to FIGS. 1-3. In some aspects, the UE 215 may utilize one or more components, such as the processor 602, the memory 604, the MultiSim module 608, the database 609, the transceiver 610, the modem 612, and the one or more antennas 616 of FIG. 6, to execute the actions of method 400. As illustrated, the method 400 includes a number of enumerated actions, but aspects of the method 400 may include additional actions before, after, and in between the enumerated actions. In some aspects, one or more of the enumerated actions may be omitted or performed in a different order.

In the method 400, the UE 215 may have a first subscription for wireless services from a first operator (e.g., operating the BS 205a) and a second subscription for wireless services from a second operator (e.g., operating the BS 205b). In some instances, the first operator and second operator may correspond to the same operator. In other instances, the first operator is different from the second operator. In some aspects, the first operator may assign the UE 215 with a first subscriber identity (e. g., IMSI) for communication using the first subscription, and the second operator may assign the UE 215 with a second subscriber identity (e.g., IMSI) for communication using the second subscription. The first subscriber identity and the second subscriber identity may be different, each uniquely identifying the UE 215 in a first network of the first operator and in a second network of the second operator, respectively. In some aspects, the UE 215 may communicate with the first network via the SIM A 210a for the first subscription using the first subscriber identity, and may communicate with the second network via the SIM B 210b for the second subscription using the second subscriber identity. In some aspects, the SIM A 210a may include a SIM card storing the first subscriber identity and/or any associated information or key(s) for authorizing and/or authenticating the UE 215a in the first network, and the SIM B 210a may include a SIM card storing the second subscriber identity and/or any associated information or key(s) for authorizing and/or authenticating the UE 215a in the second network.

At action 402, the UE 215 has established a first connection via the SIM A 210a and a first subscription (SUB 1) with the BS 205a using the first subscriber identity. The UE 215 determines whether SUB 1 is in standalone mode. If SUB 1 is not in standalone mode, then the UE 215 operates in a DSDS mode at action 404. If, on the other hand, SUB 1 is in standalone mode, then it is possible that UE 215 may find an opportunity for DSDA operation. Examples of the first technology in standalone mode include low band/high band FR1 and FR2.

At action 406, the UE accesses its database and searches for cells with another technology in standalone mode. For instance, the UE may use an identity of the cell with which the SUB 1 has established a connection as a key to search the database. Other keys that may be used to search the database include an indication of the first technology or other information as appropriate. In any event, the UE may prioritize entries in the database that include information for a cell for another technology. For instance, if SUB 1 has a connection with a cell in FR1 in standalone mode, then the UE may prioritize entries in the database that include information for FR2 in standalone mode (or vice versa). In another example, if SUB 1 has a connection with the cell in low band FR1 standalone mode, then the UE may prioritize entries in the database that include information for high band FR2 in standalone mode (or vice versa).

At action 408, the UE 215 determines whether the database indicates availability of a cell with another technology in standalone mode. If so, then the UE 215 may cause the SIM B 215b and a second subscription (SUB 2) to establish communication with the cell and then operate in DSDA mode at action 410. If there is not availability of a cell with another technology in standalone mode, then the UE 215 may search for another cell with the other technology in standalone mode at action 412. In other words, the database may not be comprehensive, or some cells may have been added to or deleted from the network so that the information in the database is not quite up to date.

If the UE 215 is successful in finding a cell with the other technology in standalone mode, then UE 215 may establish a connection via SIM B 210b and SUB 2 with the other cell in standalone mode and operate in DSDA mode at action 410. If no other cell is offering the other technology in standalone mode, then the UE 215 may cause SUB 2 to establish a connection with another available cell (e.g., in non-standalone mode or a legacy technology, such as LTE) and then operate in DSDS mode at action 404.

Returning to action 410, if the UE 215 finds a cell offering another technology in standalone mode, then it may update the database at 418 to indicate that the second cell may be available for use when one of the SUBs has established a connection with the first cell. Then, in a subsequent procedure when one of the SUBs has established a connection with the first cell in standalone mode, then the database entry may provide a quick way for the UE 215 to find an available other cell for opportunistic DSDA.

Updating the database at action 418 may include performing background searches to further update the database, even when the UE 215 is operating in DSDS mode. For instance, even as the UE 215 provides operation in either DSDA or DSDS mode, it may search in the background for other available cells for populating the database. In one example, when the UE 215 camps on an LTE-only cell, it may start a short timer during the first-round background search, for example every two minutes. However, the scope of embodiments is not limited to any timer duration, as any appropriate duration is within the scope of embodiments. If after the first background search, the UE 215 does not find any 5G NR cells operating in standalone mode, then the UE 215 may extend the timer to a longer value. For example, a second round could be 10 minutes, the third round could be 20 minutes, fourth-round can be 40 minutes, and on and on. Another example includes a periodic background search timer. For instance, when the UE camps on a cell offering a standalone 5G NR technology, the UE 215 may start background search periodically to detect other cells offering a standalone 5G NR technology. For example, UE 215 may start a background search every 30 minutes, 60 minutes, or other appropriate period.

The example provided above discusses an instance in which the UE 215 searches for another 5G NR technology in standalone mode so that it can provide opportunistic DSDA. Some implementations may further prioritize searching for the other technology in standalone mode to find another cell belonging to the same operator as the first cell. For instance, if both of the SIMs 210 belong to the same operator, then action 406 may further prioritize potential connections in the database that belong to the same cell and operator as well, and action 414 may also prioritize technologies at the same cell. Should UE 215 be able to identify another technology offered by the same operator from the same cell, then the UE 215 may be able to establish connections to both SIMs 210 using complementary standalone technologies (e.g., low band/high band FR1 or FR1/FR2) and then share a protocol stack during operation. As explained above, sharing a protocol stack may save power at the UE versus a scenario in which each of the SIMs 210 is supported by a separate protocol stack.

Figure 5:
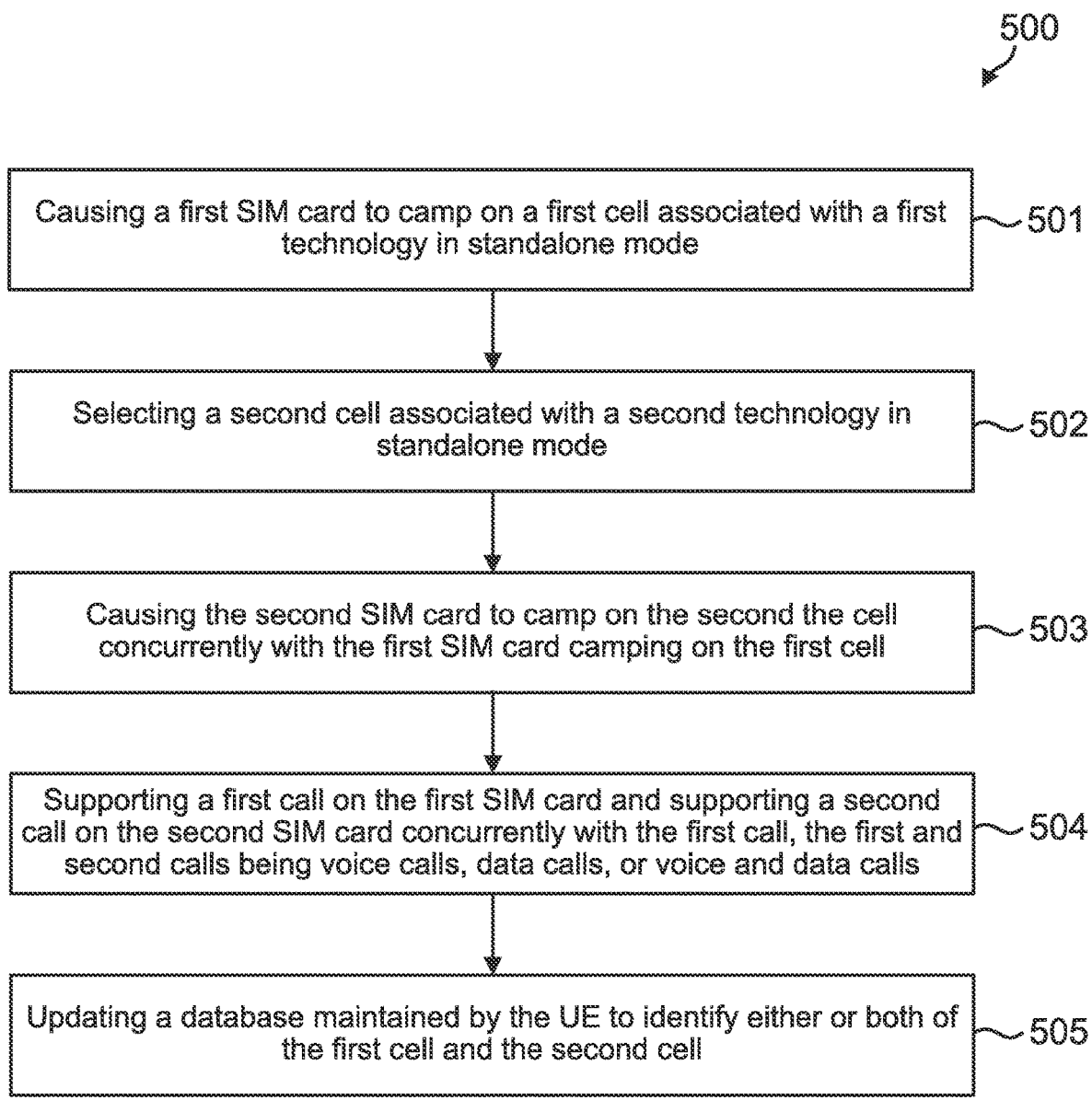
FIG. 5 is a flow diagram of a wireless communication method according to some aspects of the present disclosure.

FIG. 5 is a flowchart of a communication method 500 that utilizes multiple subscriptions according to some aspects of the present disclosure. The method 500 may be performed by a MultiSim UE (e.g., the UEs 115 and/or 215), and the method 500 may employ similar mechanisms as discussed above in relation to FIGS. 1-4. In some aspects, the UE 215 may utilize one or more components, such as the processor 602, the memory 604, the MultiSim module 608, the database 609, the transceiver 610, the modem 612, and the one or more antennas 616 of FIG. 6, to execute the actions of method 500. As illustrated, the method 500 includes a number of enumerated actions, but aspects of the method 500 may include additional actions before, after, and in between the enumerated actions. In some aspects, one or more of the enumerated actions may be omitted or performed in a different order.

At action 501, a first SIM card is caused to camp on a first cell associated with the first technology in standalone mode. For instance, the first SIM card may camp on the cell and use a technology such as FR1 in standalone mode, FR2 in standalone mode, or either one of low band or high band FR1 in standalone mode. An example is described above with respect to FIG. 2, where SIM A 210a camps on cell 205a.

At action 502, the UE selects a second cell associated with a second technology in standalone mode. For instance, if the first SIM card is camped on FR1 in standalone mode, then the UE may select a cell associated with FR2 in standalone mode (or vice versa). Similarly, if the first SIM card is camped on a low band. FR1 in standalone mode, then the UE may select a cell associated with a high band FR1 in standalone mode (or vice versa). Examples of selecting a second cell are described above with respect to FIG. 4 at actions 406-414. For instance, the UE may access its database and then prioritize entries in the database that are associated with the second technology. Additionally or alternatively, the UE may search for cells as in action 412.

At action 503, the UE causes the second SIM card to camp on the second cell concurrently with the first SIM card camping on the first cell. As a result of action 503, the two SIM cards in the UE are now camping on two different technologies, both in standalone mode, and those technologies do not interfere with each other. For instance, when using FR1 and FR2 concurrently, the RF chains may be separate and independent for FR1 and FR2. Similarly, action 503 may include a single transceiver for FR1 concurrently tuning a first band (e.g., low band) and a second band (e.g., a high band), where the two bands are orthogonal.

At action 504, the UE supports a first call on the first SIM card and supports a second call on the second SIM card concurrently with the first call. The first call may be a voice call, a data call, or a voice and data call. The second call may also be a voice call, a data call, or a voice and data call. Thus, method 500 may provide true concurrency in a DSDA context. Furthermore, the two SIM cards may each have full page decode without collision and may reduce or eliminate RE coexistence mitigation at the software level.

In some implementations, the two cells may be the same cell providing access from two different technologies and associated with the same operator. Assuming that both SIM cards are associated with that operator, then it is possible that the actions of 503 and 504 may include sharing a protocol stack. An example of a protocol stack may include a set of protocols prescribed by 3GPP or other organization and is implemented by the operator.

At action 505, the UE updates its database to identify either or both of the first cell and the second cell. For instance, in a scenario in which either the first cell or the second cell was not already included in the database, the UE may then update the database to indicate that the first cell and the second cell may be used together in some situations. Updating the database is described above in more detail with respect to action 418 of FIG. 4.

The scope of implementations is not limited to the series of actions 501-505. Rather, other implementations may add, omit, rearrange, or modify various actions. For instance, some implementations may include performing background searches to update the database and/or to find another technology in standalone mode. Also, one cell may drop or mobility may force one or more of the SIM cards to move to another technology that is not in standalone mode. In that instance, if a legacy technology or a 5G technology in non-standalone mode is selected for one or both of the SIM cards, then the UE may fall back to DSDS behavior.

FIG. 6 is a block diagram of an exemplary UE 600 according to some aspects of the present disclosure. The UE 600 may be a UE 115 or UE 215 as discussed above in FIGS. 1-5. As shown, the UE 600 may include a processor 602, a memory 604, a MultiSim module 608, a transceiver 610 including a modem subsystem 612 and a radio frequency (RF) unit 614, and one or more antennas 616. These elements may be coupled with one another. The term "coupled" may refer to directly or indirectly coupled or connected to one or more intervening elements. For instance, these elements may be in direct or indirect communication with each other, for example via one or more buses.

The processor 602 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 604 includes a non-transitory computer-readable medium. The memory 604 may store, or have recorded thereon, instructions 606. The instructions 606 may include instructions that, when executed by the processor 602, cause the processor 602 to perform the operations described herein with reference to a UE 115, 215 in connection with aspects of the present disclosure, for example, aspects of FIGS. 1-5. Instructions 606 may also be referred to as code, which may include any type of computer-readable statements.

The MultiSim module 608 may be implemented via hardware, software, or combinations thereof. For example, the MultiSim module 608 may be implemented as a processor, circuit, and/or instructions 606 stored in the memory 604 and executed by the processor 602. The MultiSim module 608 may communicate with one or more components of UE 600 to implement various aspects of the present disclosure, for example, aspects of FIGS. 1-5.

In sonic aspects, the MultiSim module 608 may include multiple SIMs or SIM cards (e.g., 2, 3, 4, or more) similar to the SIMs 210. Each SIM may be configured to store information used for accessing a network, for example, to authenticate and identify the UE 600 as a subscriber of the network. Some examples of information stored on a SIM may include, but not limited to, a subscriber identity such as an international mobile subscriber identity (IMSI) and/or information and/or key used to identify and authenticate the UE 600 in a certain provider network. In some aspects, the UE 600 may have a first subscription on a first SIM of the multiple SIMs and a second subscription on a second SIM of the multiple SIMs. The first subscription may identify the UE 600 by a first subscriber identity, and the second subscription may identify the UE 600 by a second subscriber identity.

In some aspects, the database 609 may be implemented as described above with respect to FIG. 4 in FIG. 5. That is, the database 609 may include a plurality of entries identifying cells, their associated available technologies, availability of standalone mode, proximity to other cells, usage in the past with other cells, carrier identification, and the like. The UE may include the database in the memory 604 or other memory, and the processor 602 may access the database 609 to read and/or write entries therein. Database searching may be performed according to any appropriate technique and may include prioritizing or de-prioritizing entries during a search to enhance the chances of finding two complementary technologies in standalone mode so that DSDA operation may be achieved. Examples of complementary technologies include, but are not limited to, FR1 and FR2 as well as low band FR1 and high band FR1.

As shown, the transceiver 610 may include the modem subsystem 612 and the RF unit 614. The transceiver 610 can be configured to communicate bi-directionally with other devices, such as the BSs 105 and 500. The modem subsystem 612 may be configured to modulate and/or encode the data from the memory 604, the MultiSim module 608 according to a modulation and coding scheme (MCS), e.g., a low-density parity check (LDPC) coding scheme, a turbo coding scheme, a convolutional coding scheme, a digital beamforming scheme, etc. The RF unit 614 may be configured to process (e.g., perform analog to digital conversion or digital to analog conversion, etc.) modulated/encoded data (e.g., PUCCH data, PUCCH UCI, MSG1, MSG3, etc.) or of transmissions originating from another source such as a UE 115, a BS 105, or an anchor. The RF unit 614 may be further configured to perform analog beamforming in conjunction with the digital beamforming. Although shown as integrated together in transceiver 610, the modem subsystem 612 and the RF unit 614 may be separate devices that are coupled together at the UE 600 to enable the UE 600 to communicate with other devices.

The RF unit 614 may provide the modulated and/or processed data, e.g. data packets (or, more generally, data messages that may contain one or more data packets and other information), to the antennas 616 for transmission to one or more other devices. The antennas 616 may further receive data messages transmitted from other devices. The antennas 616 may provide the received data messages for processing and/or demodulation at the transceiver 610. The transceiver 610 may provide the demodulated and decoded data (e.g., RRC configurations, MIB, SIB, PDSCH data and/or PDCCH DCIs, etc.) to the MultiSim module 608 for processing. The antennas 616 may include multiple antennas of similar or different designs in order to sustain multiple transmission links.

In an aspect, the UE 600 can include multiple transceivers 610 implementing different RATs (e.g., NR and LTE). In an aspect, the UE 600 can include a single transceiver 610 implementing multiple RATs (e.g., NR and LTE). In an aspect, the transceiver 610 can include various components, where different combinations of components can implement different RATs.

Figure 7:
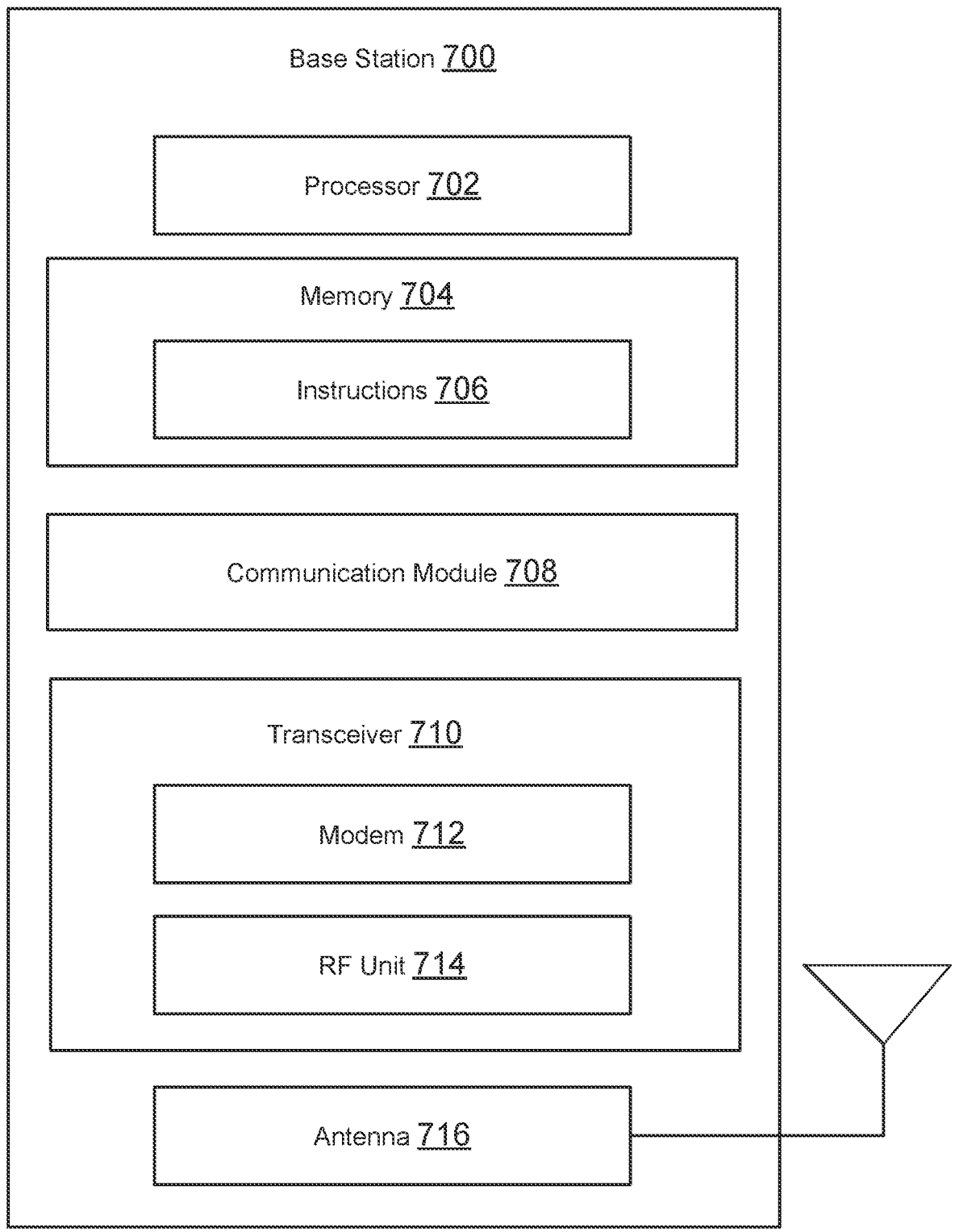
FIG. 7 illustrates a block diagram of a base station (BS) according to some aspects of the present disclosure.

FIG. 7 is a block diagram of an exemplary BS 700 according to some aspects of the present disclosure. The BS 700 may be a BS 105 or a BS 205 as discussed in FIGS. 1 and 2. As shown, the BS 700 may include a processor 702, a memory 704, a communication module 708, a transceiver 710 including a modem subsystem 712 and a RF unit 714, and one or more antennas 716. These elements may be coupled with one another. The term "coupled" may refer to directly or indirectly coupled or connected to one or more intervening elements. For instance, these elements may be in direct or indirect communication with each other, for example via one or more buses.

The processor 702 may have various features as a specific-type processor. For example, these may include a CPU, a DSP, an ASIC, a controller, a FPGA device, another hardware device, a firmware device, or any combination thereof configured to perform the operations described herein. The processor 702 may also be implemented as a combination of computing devices, e.g., a combination of a DSP and a microprocessor, a plurality of microprocessors, one or more microprocessors in conjunction with a DSP core, or any other such configuration.

The memory 704 may include a cache memory (e.g., a cache memory of the processor 702), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 704 may include a non-transitory computer-readable medium. The memory 704 may store instructions 706. The instructions 706 may include instructions that, when executed by the processor 702, cause the processor 702 to perform operations described herein, for example, aspects of FIGS. 1 and 2. Instructions 706 may also be referred to as program code. The program code may be for causing a wireless communication device to perform these operations, for example by causing one or more processors (such as processor 702) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The communication module 708 may be implemented via hardware, software, or combinations thereof. For example, the communication module 708 may be implemented as a processor, circuit, and/or instructions 706 stored in the memory 704 and executed by the processor 702. In some examples, the communication module 708 can be integrated within the modem subsystem 712. For example, the communication module 708 can be implemented by a combination of software components (e.g., executed by a DSP or a general processor) and hardware components (e.g., logic gates and circuitry) within the modem subsystem 712. The communication module 708 may communicate with one or more components of BS 700 to implement various aspects of the present disclosure, for example, aspects of FIGS. 1 and 2.

As shown, the transceiver 710 may include the modem subsystem 712 and the RF unit 714. The transceiver 710 can be configured to communicate bi-directionally with other devices, such as the UEs 115, 215 and/or BS 700 and/or another core network element. The modem subsystem 712 may be configured to modulate and/or encode data according to a MCS, e.g., a LDPC coding scheme, a turbo coding scheme, a convolutional coding scheme, a digital beamforming scheme, etc. The RF unit 714 may be configured to process (e.g., perform analog to digital conversion or digital to analog conversion, etc.) modulated/encoded data (e.g., RRC configurations, MIB, SIB, PDSCH data and/or PDCCH DCIs, etc.) from the modem subsystem 712 (on outbound transmissions) or of transmissions originating from another source such as a UE 115, 215, and/or LE 700. The RF unit 714 may be further configured to perform analog beamforming in conjunction with the digital beamforming. Although shown as integrated together in transceiver 710, the modem subsystem 712 and/or the RF unit 714 may be separate devices that are coupled together at the BS 700 to enable the BS 700 to communicate with other devices.

The RF unit 714 may provide the modulated and/or processed data, e.g. data packets (or, more generally, data messages that may contain one or more data packets and other information), to the antennas 716 for transmission to one or more other devices. The antennas 716 may further receive data messages transmitted from other devices and provide the received data messages for processing and/or demodulation at the transceiver 710. The transceiver 710 may provide the demodulated and decoded data (e.g., PUSCH data, PUCCH UCI, MSG1, MSG3, etc.) to the communication module 708 for processing. The antennas 716 may include multiple antennas of similar or different designs in order to sustain multiple transmission links.

In an aspect, the BS 700 can include multiple transceivers 710 implementing different RATs (e.g., NR and LTE). In an aspect, the BS 700 can include a single transceiver 710 implementing multiple RATs (e.g., NR and LTE). In an aspect, the transceiver 710 can include various components, where different combinations of components can implement different RATs.

Further aspects of the present disclosure include the following clauses:

1. A method of wireless communication performed by a user equipment (UE), the method comprising:
   in the UE, having a first subscriber identity module (SIM) and a second SIM, causing the first SIM to camp on a first cell associated with a first technology in standalone mode;
   selecting a second cell associated with a second technology in standalone mode; and
   causing the second SIM to camp on the second cell concurrently with the first SIM camping on the first cell.
2. The method of clause 1, further comprising:
   supporting a first call on the first SIM; and
   supporting a second call on the second SIM concurrently with the first call.
3. The method of clause 2, wherein the first call comprises an item from a list consisting of: a voice call, a data call, and a voice and data call.
4. The method of clause 2, wherein the second call comprises an item from a list consisting of: a voice call, a data call, and a voice and data call.
5. The method of clauses 1-4, wherein the first technology comprises frequency range 1 (FR1), and wherein the second technology comprises frequency range 2 (FR2).
6. The method of clauses 1-5, wherein the first technology comprises frequency range 2 (FR2), and wherein the second technology comprises frequency range 1 (FR1)
7. The method of clauses 1-6, wherein the first technology comprises a first band within frequency range 1 (FR1), and wherein the second technology comprises a second band within FR1.
8. The method of clause 7, further comprising:
   a single transceiver for FR1 concurrently tuning the first band and the second band.
9. The method of clauses 1-8, wherein the first cell and the second cell comprise a same cell, the method further comprising:
   concurrently supporting a first call by the first SIM and a second call by the second SIM, wherein the first call and the second call are performed using a shared protocol stack.
10. The method of clauses 1-9, wherein selecting the second cell comprises:
    in response to the first SIM camping on the first cell, prioritizing an entry in a database based at least in part on the entry being associated with the second technology.
11. The method of clauses 1-10, further comprising:
    updating a database maintained by the UE to identify either or both of the first cell and the second cell.
12. The method of clauses 1-11, further comprising:
    updating a database maintained by the UE to associate the first cell with the second cell; and
    subsequently, accessing the database to select the second cell based at least in part on either the first SIM or the second SIM camping on the first cell.
13. A user equipment (UE) comprising:
    a first subscriber identity module (SIM) associated with a first service provider subscription and a second SIM associated with a second service provider subscription; and
    a processor configured to access the first SIM and the second SIM, the processor further configured to:
      camp on a first cell associated with a first technology in standalone mode using the first service provider subscription;
      select a second cell associated with a second technology in standalone mode; and
      camp on the second cell, using the second service provider subscription, concurrently with camping on the first cell.
14. The UE of clause 13, wherein the first technology comprises a first band within frequency range 1 (FR1, and wherein the second technology comprises a second band within FR1.
15. The UE of clause 14, further comprising a transceiver, the processor further configured to:
    cause the transceiver to concurrently tune the first band and the second band.
16. The UE of clauses 13-15, further comprising a first transceiver associated with frequency range 1 (FR1) and a second transceiver associated with frequency range 2 (FR2), wherein the processor is configured to utilize the first transceiver to camp on the first cell and utilize the second transceiver to camp on the second cell.
17. The UE of clauses 13-16, further comprising a first transceiver associated with frequency range 1 (FR1) and a second transceiver associated with frequency range 2 (FR2), wherein the processor is configured to utilize the second transceiver to camp on the first cell and utilize the first transceiver to camp on the second cell.
18. The UE of clauses 13-17, wherein the first cell and the second cell comprise a same cell, the processor further configured to:
concurrently support a first call by the first service provider subscription and a second call by the second service provider subscription, wherein the first call and the second call are performed using a shared protocol stack.
19. The UE of clauses 13-18, further comprising:
a memory storing a database, wherein the processor is further configured to:
update the database, including associating the first cell with the second cell; and
subsequently, accessing the database, including selecting the second cell based at least in part on either the first service provider subscription or the second service provider subscription camping on the first cell.
20. A non-transitory computer-readable medium having program code recorded thereon for wireless communication by a user equipment (UE), the program code comprising:
  code for camping on a first cell associated with a first technology in standalone mode using a first service provider subscription;
  code for selecting a second cell associated with a second technology in standalone mode; and
  code for providing Dual SIM Dual Active (DSDA) operation, including camping on the second cell using a second service provider subscription concurrently with camping on the first cell.
21. The non-transitory computer-readable medium of clause 20, further comprising:
code for supporting a first call on the first service provider subscription; and
code for supporting a second call on the second service provider subscription concurrently with the first call.
22. The non-transitory computer-readable medium of clauses 20-21, wherein the first technology comprises a first band within frequency range 1 (FR1), and wherein the second technology comprises a second band within FR1.
23. The non-transitory computer-readable medium of clause 22, further comprising:
code for concurrently tuning the first band and the second band using a single transceiver for FR1.
24. The non-transitory computer-readable medium of clauses 20-23, further comprising:
code for concurrently supporting a first call by the first service provider subscription and a second call by the second service provider subscription, wherein the first call and the second call are performed using a shared protocol stack.
25. The non-transitory computer-readable medium of clauses 20-24, further comprising:
code for updating a database maintained by the UE to associate the first cell with the second cell; and
code for subsequently accessing the database to select the second cell based at least in part on either the first service provider subscription or the second service provider subscription camping on the first cell.
26. A user equipment (UE) comprising:
  means for camping on a first cell associated with a first technology in standalone mode using a first service provider subscription;
  means for selecting a second cell associated with a second technology in standalone mode; and
  means for providing Dual SIM Dual Active (DSDA) operation, including camping on the second cell using a second service provider subscription concurrently with camping on the first cell.
27. The UE of clause 26, wherein the first service provider subscription is associated with a first subscriber identity module (SIM), and wherein the second service provider subscription is associated with a second SIM.
28. The UE of clauses 26-27, further comprising:
means for supporting a first call on the first service provider subscription concurrently with a second call on the second service provider subscription.
29. The UE of clauses 26-28, wherein the means for providing DSDA operation comprises:
a single transceiver for frequency range 1 (FR1) concurrently tuning a first FR1 band and a second FR1 band.
30. The UE of clauses 26-29, wherein the means for providing DSDA operation comprises:
a first transceiver for frequency range 1 (FR1) and a second transceiver for frequency range 2 (FR2). The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g, a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A method of wireless communication performed by a user equipment (UE), the method comprising:
   in the UE, having a first subscriber identity module (SIM) and a second SIM, causing the first SIM to camp on a first cell associated with a first technology in standalone mode;
   searching a database having a plurality of entries identifying a plurality of cells, associated available technologies of the plurality of cells, and availability of standalone mode, wherein searching the database includes prioritizing ones of the entries indicating availability of standalone mode;
   selecting, from the entries, a second cell associated with a second technology in standalone mode; and
   causing the second SIM to camp on the second cell concurrently with the first SIM camping on the first cell.

2. The method of claim 1, further comprising:
   supporting a first call on the first SIM; and
   supporting a second call on the second SIM concurrently with the first call.

3. The method of claim 2, wherein the first call comprises an item from a list consisting of: a voice call, a data call, and a voice and data call.

4. The method of claim 2, wherein the second call comprises an item from a list consisting of: a voice call, a data call, and a voice and data call.

5. The method of claim 1, wherein the first technology comprises frequency range 1 (FR1), and wherein the second technology comprises frequency range 2 (FR2).

6. The method of claim 1, wherein the first technology comprises frequency range 2 (FR2), and wherein the second technology comprises frequency range 1 (FR1).

7. The method of claim 1, wherein the first technology comprises a first band within frequency range 1 (FR1), and wherein the second technology comprises a second band within FR1.

8. The method of claim 7, further comprising:
   a single transceiver for FR1 concurrently tuning the first band and the second band.

9. The method of claim 1, wherein the first cell and the second cell comprise a same cell, the method further comprising:
   concurrently supporting a first call by the first SIM and a second call by the second SIM, wherein the first call and the second call are performed using a shared protocol stack.

10. The method of claim 1, further comprising:
    updating the database to associate the first cell with the second cell; and
    subsequently, accessing the database to select the second cell based at least in part on either the first SIM or the second SIM camping on the first cell.

11. The method of claim 1, further comprising:
    switching from Dual SIM Dual Active (DSDA) operation to dual-SIM dual-standby (DSDS) operation in response to moving the first SIM to another technology in non-standalone mode.

12. A user equipment (UE) comprising:
    a first subscriber identity module (SIM) associated with a first service provider subscription and a second SIM associated with a second service provider subscription; and
    a processor configured to access the first SIM and the second SIM, the processor further configured to:
       camp on a first cell associated with a first technology in standalone mode using the first service provider subscription;
       search a database having a plurality of entries identifying a plurality of cells, associated available technologies of the plurality of cells, and availability of standalone mode, wherein searching the database includes prioritizing ones of the entries indicating availability of standalone mode;
       select, from the entries, a second cell associated with a second technology in standalone mode; and
       camp on the second cell, using the second service provider subscription, concurrently with camping on the first cell.

13. The UE of claim 12, wherein the first technology comprises a first band within frequency range 1 (FR1), and wherein the second technology comprises a second band within FR1.

14. The UE of claim 13, further comprising a transceiver, the processor further configured to:
    cause the transceiver to concurrently tune the first band and the second band.

15. The UE of claim 12, further comprising a first transceiver associated with frequency range 1 (FR1) and a second transceiver associated with frequency range 2 (FR2), wherein the processor is configured to utilize the first transceiver to camp on the first cell and utilize the second transceiver to camp on the second cell.

16. The UE of claim 12, further comprising a first transceiver associated with frequency range 1 (FR1) and a second transceiver associated with frequency range 2 (FR2), wherein the processor is configured to utilize the second transceiver to camp on the first cell and utilize the first transceiver to camp on the second cell.

17. The UE of claim 12, wherein the first cell and the second cell comprise a same cell, the processor further configured to:
    concurrently support a first call by the first service provider subscription and a second call by the second service provider subscription, wherein the first call and the second call are performed using a shared protocol stack.

18. The UE of claim 12, further comprising:
    a memory storing the database, wherein the processor is further configured to:
    update the database, including associating the first cell with the second cell; and
    subsequently, accessing the database, including selecting the second cell based at least in part on either the first service provider subscription or the second service provider subscription camping on the first cell.

19. A non-transitory computer-readable medium having program code recorded thereon for wireless communication by a user equipment (UE), the program code comprising:

code for camping on a first cell associated with a first technology in standalone mode using a first service provider subscription;

code for searching a database having a plurality of entries identifying a plurality of cells, associated available technologies of the plurality of cells, and availability of standalone mode, wherein searching the database includes prioritizing ones of the entries indicating availability of standalone mode;

code for selecting, from the entries, a second cell associated with a second technology in standalone mode; and code for providing Dual SIM Dual Active (DSDA) operation, including camping on the second cell using a second service provider subscription concurrently with camping on the first cell.

20. The non-transitory computer-readable medium of claim 19, further comprising:

code for supporting a first call on the first service provider subscription; and code for supporting a second call on the second service provider subscription concurrently with the first call.

21. The non-transitory computer-readable medium of claim 19, wherein the first technology comprises a first band within frequency range 1 (FR1), and wherein the second technology comprises a second band within FR1.

22. The non-transitory computer-readable medium of claim 21, further comprising:

code for concurrently tuning the first band and the second band using a single transceiver for FR1.

23. The non-transitory computer-readable medium of claim 19, further comprising:

code for concurrently supporting a first call by the first service provider subscription and a second call by the second service provider subscription, wherein the first call and the second call are performed using a shared protocol stack.

24. The non-transitory computer-readable medium of claim 19, further comprising:

code for updating the database to associate the first cell with the second cell; and code for subsequently accessing the database to select the second cell based at least in part on either the first service provider subscription or the second service provider subscription camping on the first cell.

25. A user equipment (UE) comprising:

means for camping on a first cell associated with a first technology in standalone mode using a first service provider subscription;

means for searching a database having a plurality of entries identifying a plurality of cells, associated available technologies of the plurality of cells, and availability of standalone mode, wherein searching the database includes prioritizing ones of the entries indicating availability of standalone mode;

means for selecting, from the entries, a second cell associated with a second technology in standalone mode; and means for providing Dual SIM Dual Active (DSDA) operation, including camping on the second cell using a second service provider subscription concurrently with camping on the first cell.

26. The UE of claim 25, wherein the first service provider subscription is associated with a first subscriber identity module (SIM), and wherein the second service provider subscription is associated with a second SIM.

27. The UE of claim 25, further comprising:

means for supporting a first call on the first service provider subscription concurrently with a second call on the second service provider subscription.

28. The UE of claim 25, wherein the means for providing DSDA operation comprises:

a single transceiver for frequency range 1 (FR1) concurrently tuning a first FR1 band and a second FR1 band.

29. The UE of claim 25, wherein the means for providing DSDA operation comprises:

a first transceiver for frequency range 1 (FR1) and a second transceiver for frequency range 2 (FR2).

* * * * *